(12) United States Patent
Wang et al.

(10) Patent No.: US 12,506,705 B1
(45) Date of Patent: Dec. 23, 2025

(54) SYSTEMS AND METHODS FOR MANAGING NETWORK IDENTIFIERS IN DISTRIBUTED COMPUTING SYSTEMS

(71) Applicant: Obsidian Security, Inc., Newport Beach, CA (US)

(72) Inventors: Shuyang Wang, Campbell, CA (US); Marcus McCurdy, Haddon Township, NJ (US)

(73) Assignee: Obsidian Security, Inc., Newport Beach, CA (US)

( * ) Notice: Subject to any disclaimer, the term of this patent is extended or adjusted under 35 U.S.C. 154(b) by 0 days.

(21) Appl. No.: 19/228,195

(22) Filed: Jun. 4, 2025

(51) Int. Cl.
*H04L 61/4511* (2022.01)
*H04L 67/02* (2022.01)
*H04L 67/10* (2022.01)

(52) U.S. Cl.
CPC .......... *H04L 61/4511* (2022.05); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,270,811 B2 * | 4/2019 | Chang | H04W 12/35 |
| 10,277,554 B2 * | 4/2019 | Townsend | H04L 61/50 |
| 11,153,265 B1 * | 10/2021 | Fayed | H04L 61/5007 |
| 2015/0256508 A1 * | 9/2015 | Townsend | H04L 63/0884 709/245 |
| 2015/0370866 A1 * | 12/2015 | Schneider | H04L 61/3015 707/706 |
| 2018/0278653 A1 * | 9/2018 | Narayanaswamy | H04L 63/168 |

\* cited by examiner

*Primary Examiner* — Lashonda Jacobs-Burton
(74) *Attorney, Agent, or Firm* — Foley & Lardner LLP

(57) ABSTRACT

At least one aspect of the technical solutions described herein relate to a system. The system can include one or more processors coupled with memory. The system can receive a message can include an identifier of a browser extension executing on the client device and a user identifier of a software-as-a-service (SaaS) application. The system can bind a subdomain identifier with the identifier of the browser extension. The system can transmit a uniform resource identifier (URI) including the subdomain identifier to the client device. The domain name service (DNS) request can include a host identifier of the client device. The system can access a DNS log of the DNS system to identify the host identifier using the subdomain identifier. The system can bind the identifier of the browser extension and the user identifier with the host identifier of the client device.

20 Claims, 5 Drawing Sheets

SYSTEMS AND METHODS FOR MANAGING NETWORK IDENTIFIERS IN DISTRIBUTED COMPUTING SYSTEMS

TECHNICAL FIELD

This application relates generally to systems and methods to manage network identifiers in distributed computing systems.

BACKGROUND

Distributed computing environments can involve multiple computing devices communicating and exchanging data over computer networks. Such environments often include a variety of identity types, such as user identities for applications accessed remotely and machine identities within network systems. Coordinating and managing network identities securely and efficiently across different computing environments can present significant technical challenges.

SUMMARY

Various traditional approaches attempt to associate different identities in network environments to improve computer security. Such approaches to manage network identifiers use federated identities and managed identities. However, the federated identities often struggled with maintaining consistent and reliable links between network application identifiers and potentially changing machine identifiers. Managed identities may lead to difficulties in accurately correlating identities across different environments, particularly when different machine identities may be used. Such approaches often introduce latency and performance issues, leading to significant usage of computing resources and reducing performance and efficiency of security monitoring.

To address such shortcomings, the technical solutions described herein implement a browser extension as a bridge to automatically link host/machine identities with a corresponding network application identity. To do so, the systems and methods described herein can receive a message from a client device that includes an identifier of a browser extension and an identifier of a network application (e.g., a software-as-a-service (SaaS) identifier, etc.). The systems and methods described herein can bind a subdomain identifier with the identifier of the browser extension and provide a uniform resource identifier (URI) to the client device. The URI can include the subdomain identifier. The transmission of the URI can cause the client device to transmit a domain name service (DNS) request to a DNS system to resolve the URI. The systems and methods described herein can access a DNS log of the DNS system to identify a host identifier and bind the identifier of the browser extension and the user identifier with the host client device. In this manner, the systems and methods described herein can link the SaaS identifier and the host identifier while minimizing the computational cost to manage identities.

At least one aspect of the technical solutions described herein relate to a system. The system can include one or more processors coupled with memory. The system can receive, from a client device, a message can include an identifier of a browser extension executing on the client device and a user identifier of a software-as-a-service (SaaS) application. The system can bind a subdomain identifier with the identifier of the browser extension. The system can transmit a uniform resource identifier (URI) including the subdomain identifier to the client device. The URI can cause the browser extension to transmit a domain name service (DNS) request to a DNS system to resolve the URI. The DNS request can include a host identifier of the client device. The system can access a DNS log of the DNS system to identify the host identifier using the subdomain identifier. The system can bind the identifier of the browser extension and the user identifier with the host identifier of the client device.

In some implementations, the system can receive the user identifier from the SaaS application. In some implementations, the system can generate at least one data structure storing the identifier of the browser extension, the user identifier, and the host identifier of the client device. In some implementations, the system can retrieve the DNS log from the DNS system after a first time period. In some implementations, the system can access the DNS log from the DNS system in response to a second message from the browser extension. In some implementations, the system can initiate a security action based on a mismatch between the host identifier and an expected host identifier of the client device.

In some implementations, the security action comprises one or more of blocking network access to a computing system, logging data transmitted by the client device, or generating an alert identifying the client device. In some implementations, the system can generate the subdomain identifier in response to the message received from the client device. In some implementations, the system can generate the subdomain identifier to be unique to an instance of the browser extension executing on the client device. In some implementations, the message is a first message received at a first time. In some implementations, the system can receive a second message from the client device at a second time. In some implementations, the second message can include a second identifier of the browser extension and the user identifier. In some implementations, the system can determine that the user identifier is associated with the identifier of the browser extension. In some implementations, responsive to determining that the user identifier is associated with the identifier of the browser extension, the systems can generate a second subdomain identifier in response to the second message.

At least one aspect of the technical solutions described herein relate to a method. The method can be performed, for example, by one or more processors coupled to memory. The method can include receiving, from a client device, a message that includes an identifier of a browser extension executing on the client device and a user identifier of a software-as-a-service (SaaS) application. The method can include binding a subdomain identifier with the identifier of the browser extension. The method can include transmitting a uniform resource identifier (URI) including the subdomain identifier to the client device, causing the browser extension to transmit a domain name service (DNS) request to a DNS system to resolve the URI. The DNS request can include a host identifier of the client device. The method can include accessing a DNS log of the DNS system to identify the host identifier using the subdomain identifier. The method can include binding the identifier of the browser extension and the user identifier with the host identifier of the client device.

In some implementations, the method can include receiving the user identifier from the SaaS application. In some implementations, the method can include generating at least one data structure storing the identifier of the browser extension, the user identifier, and the host identifier of the client device. In some implementations, the method can include retrieving the DNS log from the DNS system after a first time period. In some implementations, the method can include accessing the DNS log from the DNS system in response to a second message from the browser extension. In some implementations, the method can include initiating a security action based on a mismatch between the host identifier and an expected host identifier of the client device.

In some implementations, the security action can include one or more of blocking network access to a computing system, logging data transmitted by the client device, or generating an alert identifying the client device. In some implementations, the method can include generating the subdomain identifier in response to the message received from the client device. In some implementations, the method can include generating the subdomain identifier to be unique to an instance of the browser extension executing on the client device. In some implementations, the message can be a first message received at a first time. In some implementations, the method can include receiving a second message from the client device at a second time. The second message can include a second identifier of the browser extension and the user identifier. In some implementations, the method can include determining that the user identifier is associated with the identifier of the browser extension. In some implementations, responsive to determining that the user identifier is associated with the identifier of the browser extension, the method can include generating a second subdomain identifier in response to the second message.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
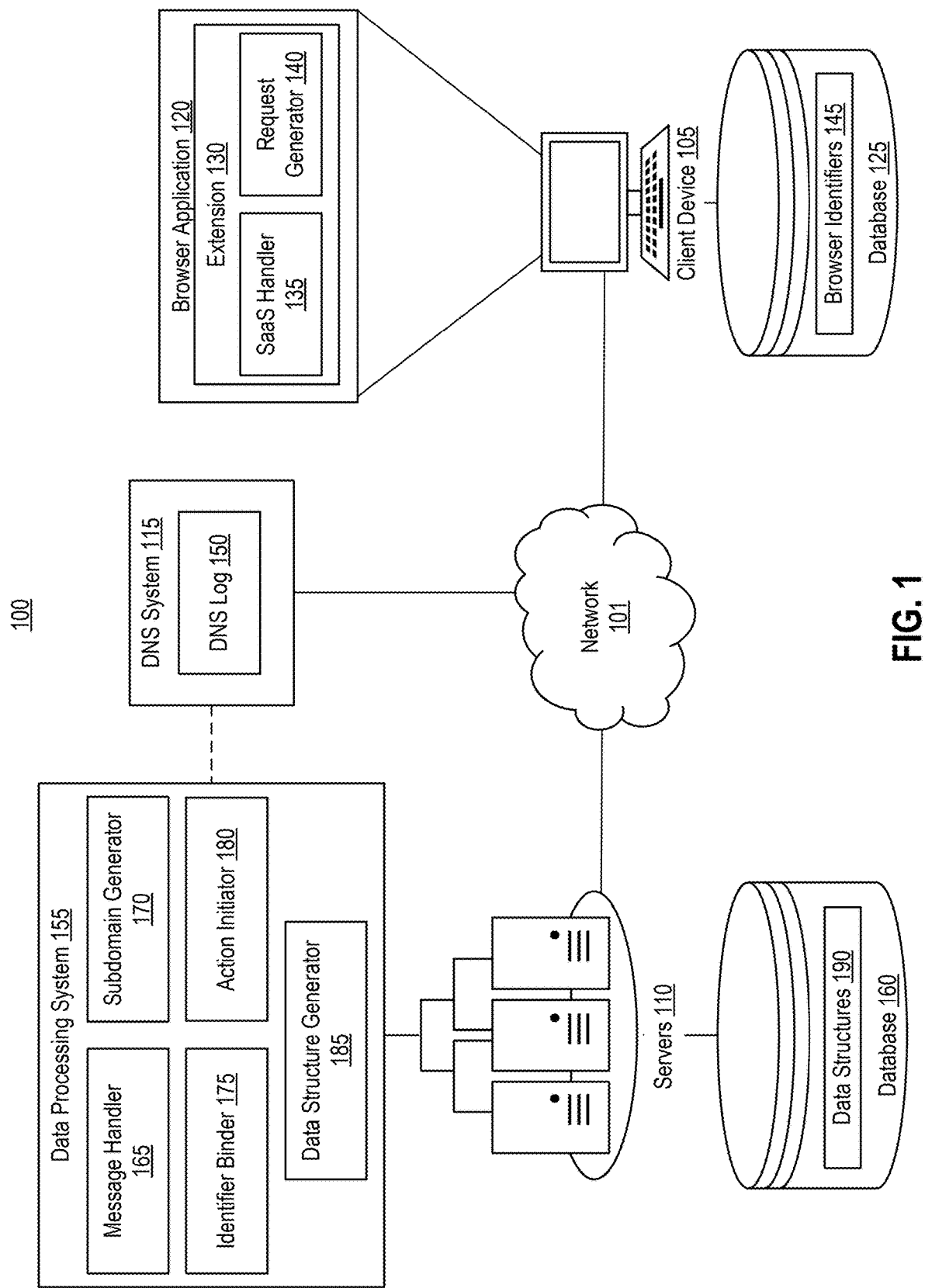
FIG. 1 illustrates a block diagram of a system for managing network identifiers in distributed computing systems, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Some implementations are related to a browser extension for a web browser. In some implementations, the browser extension can be a plugin that is installed in an environment of and/or configured to interact with the web browser. The browser extension can be associated with an identifier that is unique to that (1) user and/or user's computing device and (2) browser. Said differently, each browser used by each user and/or user computing device having the browser extension can be associated with an identifier that is different from other browsers, browser extensions, users and/or user computing devices.

The systems and methods described herein relate to identity management and security monitoring within distributed computing environments, particularly those involving software-as-a-service (SaaS) applications or endpoint computing devices. In distributed computing environments, identity management typically involves associating user identities with specific computing resources, such as applications, services, or endpoint devices, among others. Network application environments such as SaaS environments generally manage identities associated with individual users accessing cloud-based applications or services. Network security environments typically manage identities associated with computing devices, such as laptops, desktops, or mobile devices, among others. Effective security monitoring within distributed computing environments can involve correlating user identities from SaaS applications with device identities from endpoint computing environments.

Conventional identity management techniques typically rely on federated identity management protocols or managed identity solutions. Federated identity management protocols can require complex configuration processes or extensive authentication exchanges, resulting in increased computational overhead and latency in identity management. Managed identity solutions similarly involve complex configuration and authentication processes, which can introduce performance degradation or reliability issues when managing identities across distinct computing environments. Additionally, existing identity correlation methods often fail to provide accurate or consistent associations between network application identities and endpoint host identities, particularly in dynamic or multi-user computing scenarios, leading to ambiguity or miscorrelation in security monitoring processes.

The techniques described herein can be used to implement identity correlation and management involving a browser extension executing on client devices. The browser extension can function as a bridge to enable automatic association of network application identities (e.g., SaaS identities, et.) with endpoint host identities (e.g., machine identities). The techniques described herein can implement a browser extension that transmits a unique browser extension identifier and a network application identifier to a data processing system. Based on the received identifiers, the data processing system can generate a subdomain identifier associated with the browser extension instance, which is returned to the browser extension. The browser extension can use the transmit a Domain Name Service (DNS) request including the unique subdomain identifier, thereby creating a log including the host identifier in a corresponding DNS log. The data processing system can access the DNS log to correlate the network application identity and browser extension identifier with the host identifier obtained from DNS logs.

The systems and methods of the present disclosure can automatically and reliably associate network application identities with endpoint host identities without requiring federated identity configurations or extensive authentication processes. The generation or management of unique subdomain identifiers can provide accurate and granular tracking of identity correlations across multiple sessions or browser extension instances, thereby reducing ambiguity or miscorrelation in security monitoring processes. In some implementations, the techniques described herein can automatically initiate security actions based on detected identity mismatches to mitigate potential security threats. Implementing the techniques described herein provides reduced computational overhead, improves accuracy and reliability in identity correlation, and improves responsiveness in security monitoring compared to conventional identity management approaches, thereby resulting in a technical improvement over traditional techniques.

FIG. 1 illustrates a block diagram of a system 100 for managing network identifiers in distributed computing systems. The system 100 can include at least one client device 105, one or more servers 110, and a domain service name (DNS) system 115. The client device 105 can execute a browser application 120 (sometimes referred to as browser 120 herein) that can render one or more user interfaces (UIs). The browser application 120 can may include, store, or otherwise maintain a browser extension 130 (sometimes referred to as "extension 130"). The extension 130 can include at least one software as a service (SaaS) handler 135 and at least one request generator 140.

The database 125 (e.g., local database) can include hardware (e.g., hard disk drives, solid state drives, network attached storage) and/or software to manage the data stored therein. The database 125 can by maintained by the extension 130. The data can be structured, semi-structures, and unstructured. The database 125 can include browser identifiers 145 provided by the extension 130. The browser identifiers 145 can include a user agent string, cookies, internet protocol address, browser fingerprinting, HTTP headers, among others. The browser identifiers 145 can include any type of identifier relating to the client device 105, the browser application 120, the extension 130, and/or any SaaS systems (e.g., SaaS identifiers).

The servers 110 can house or execute a data processing system 155. The data processing system 155 can include at least one message handler 165, at least one subdomain generator 170, at least one identifier binder 175, at least one action initiator 180, and at least one data structure generator 185. The servers 110 can be coupled to a database 160 (e.g., remote database). The database 160 can be similar to the database 125. The database 160 can be a database management system (DBMS) that is stored within a cloud computing environment. The database 160 can include data structures 190 to store the linked identifiers. The servers 110 and the at least one client device 105 can be communicatively coupled via at least one network 101.

The DNS system 115 can include hardware (e.g., DNS servers, routers, network infrastructure) and/or software to execute various DNS operations, such as forward lookups and reverse lookups. In some implementations, the DNS system 115 can implement a local DNS cache. The DNS system can include or otherwise maintain one or more DNS logs 150 that can include a record of activity (e.g., requests, etc.) associated with the DNS system 115. The DNS log 150 can store various DNS request entries including data such as timestamps, source IPs, queried domains, query types, response IPs, and/or response codes, among others. In some implementations, the DNS system 115 can be implemented or executed by the data processing system 155 and/or one or more of the servers 110.

In some implementations, the DNS system 115 can operate as or be in communication with an endpoint detection and response (EDR) system that supervises network communications provided by the client device 105. In such implementations, the DNS system 115 can receive outbound domain name system traffic generated by applications executing on the client device 105 or forward the outbound traffic to the servers 110 for resolution or inspection. The DNS system 115 can record data associated with each outbound query within the DNS logs 150 while the EDR system associates corresponding security telemetry with the same query. In some implementations, the EDR system can retrieve process context information from the client device 105 and can attach a reference to the process context information to each DNS entry recorded by the DNS system 115.

In such implementations, the DNS logs 150 can include EDR logs in which each DNS entry is associated with host identifier information describing the client device 105. The host identifier information can include a globally unique identifier (GUID), a media access control (MAC) address, or a hostname, among others. In some implementations, the DNS system 115 can retrieve the host identifier information from the client device 105 during an initial handshake sequence and can append the host identifier information to each subsequent DNS entry stored in the DNS logs 150. The DNS logs 150 can maintain a mapping between each DNS request and the client device 105.

In some implementations, the DNS logs 150 can further store contextual fields in association with each DNS request. In some implementations, the DNS system 115 can incorporate a timestamp reflecting the time that the DNS request was transmitted by the client device 105, a response code returned by an upstream resolver, and/or a time-to-live (TTL) value, among others. The DNS system 115 can include the contextual fields with traditional DNS resolution data.

The browser 120 can be any type of software program that can access one or more web pages and/or web applications. The software program can include one or more instructions embedded within code in a functional language (e.g., Python, Java, etc.) to allow a user of a client device 105 to interact with content and other services accessible by the web (e.g., internet). The browser 120 can render various interpretable languages such as Hyper Text Mark-Up Language (HTML), cascading style sheet (CSS), JavaScript, among others to present web pages and/or web applications via a user interface of the client device 105. The browser 120 can be in communication with or can include servers 110, databases (e.g., database 160, database 125), application programming interfaces (APIs), among others to process requests and store data.

The extension 130 can be any type of browser extension and/or plugin that can trigger or cause the client device 105 to perform and/or execute any of the tasks/processes described herein. The extension 130 can be included with the browser 120, and can monitor content of any webpage, web site, or web domain of the client device 105. The extension 130 can include instructions to store browser identifier associated with the webpage content, in some implementations, transmit data to the server 110, as described in further detail herein. The extension 130 can be installed on the browser 120 at the client device 105. The extension 130 can be associated with an identifier (e.g., a browser identifier 145) that is unique to browser and at least one of the browser 120 or client device 105. The identifier may be generated and/or assigned (e.g., by the computing device) when and/or after browser extension 130 has been installed for the browser 120.

The extension 130 can execute a SaaS handler 135. The SaaS handler 135 can include hardware, software, or any combination thereof to perform various operations described herein. The SaaS handler 135 can transmit, send, or otherwise manage identifiers of a SaaS application. The extension 130 can execute a request generator 140. The request generator 140 can include hardware, software, or any combination thereof to perform various operations described herein. The request generator 140 can generate, transmit, otherwise identify a request to/for a DNS system 115.

The data processing system 155 can be any computing device including one or more processors coupled with memory. The data processing system 155 can include hardware, software, or combinations thereof that can perform any of the various processes/tasks described herein. In some implementations, the data processing system 155 can be, or may be part of, a computing system (e.g., a server, an end-user computing device such as a laptop, PC, smart device, etc.) or within a server group (e.g., a data center, a branch office, or a server site), and include instructions to transmit messages to the client device 105, generate subdomain identifiers and data structures, initiate actions, and bind identifiers. The data processing system 155 can be in communication with the client device 105.

In some implementations, the message handler 165 can transmit, send, or otherwise receive messages to and from the client device 105. The subdomain generator 170 can generate, identify, or otherwise determine subdomain identifiers based on messages from the client device 105. The identifier binder 175 can bind, link, or otherwise associate the subdomain identifier, host identifier, user identifier, or the browser identifier 145. The action initiator 180 can trigger, initiate, or otherwise cause at least one action at the client device 105. The data structure generator 185 can generate, identity, or otherwise create at least one data structure 190 to store the identifiers within the database 160.

The system 100 is not confined to the components described herein and may include additional or alternate components, not shown for brevity, which are to be considered within the scope of the embodiments described herein.

Figure 2:
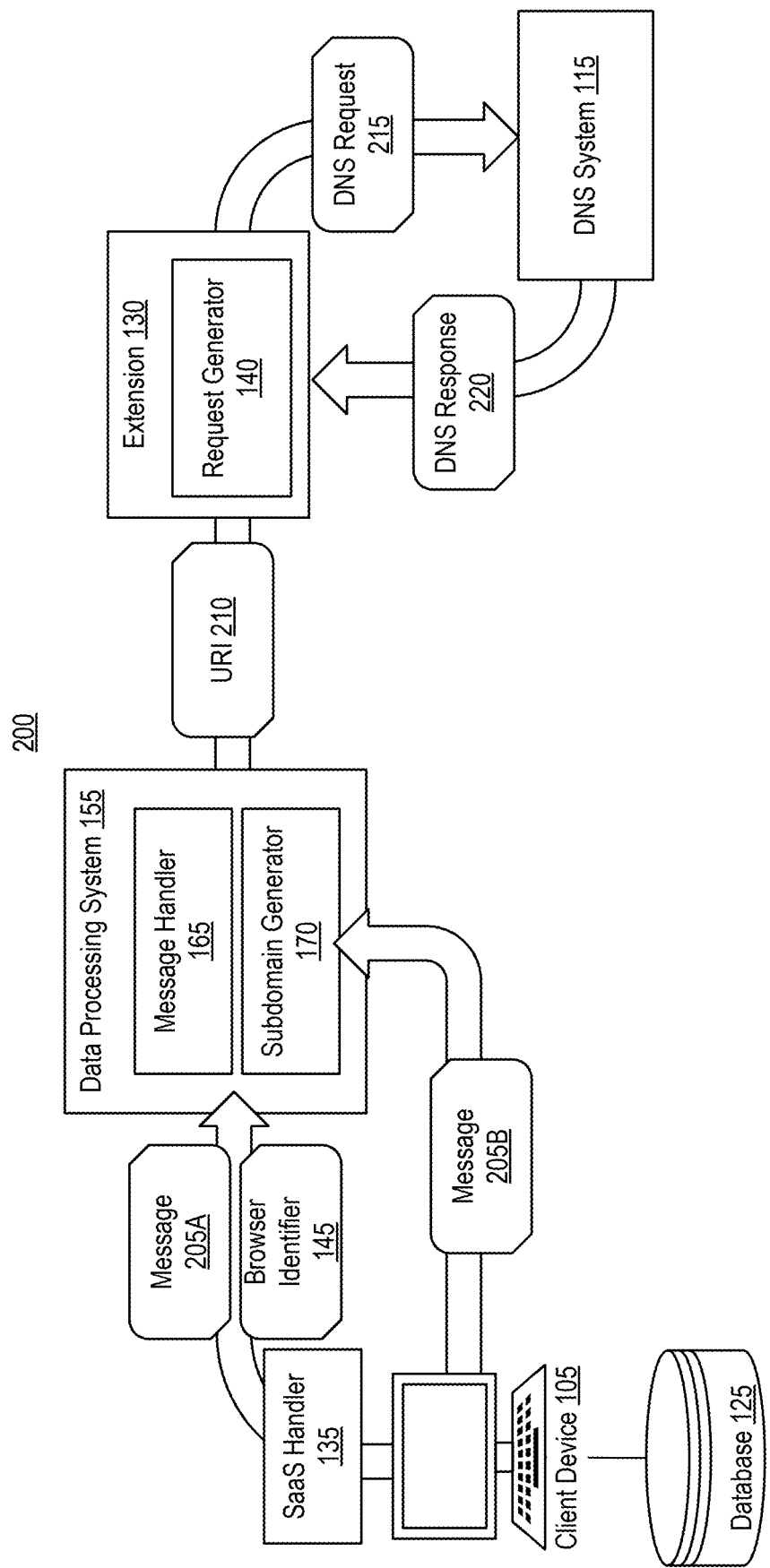
FIG. 2 illustrates an example of a process of receiving browser identifiers and accessing a DNS log, according to an embodiment.

FIG. 2 illustrates an example of a process 200 of using data from a DNS log 150 to associate host identifiers with browser identifiers 145. The process 200 can include or correspond to operations performed in the system 100. Under the process 200, the SaaS handler 135 can receive, retrieve, or otherwise obtain a user identifier from the SaaS application. In some implementations, the user identifier can be assigned by the extension 130, the browser application 120, the client device 105, and/or the user accessing the client device 105 based on the SaaS application or authentication systems associated therewith. In one example, the user identifier can be represented as a token generated by the SaaS application or an associated authentication system. The SaaS handler 135 can obtain the user identifier from the database 125 or from local storage of the client device 105. In some implementations, user identifier can be generated as a unique ID, a hash value, an access token, or a refresh token, among other types of identifiers.

The SaaS handler 135 can generate a message 205A associated with the extension 130 executing on the browser 120. The message 205A can be a signal, a notification, a collection of bits, that includes the user identifier associated with the client device 105. The SaaS handler 135 can embed the user identifier from the SaaS application within the message 205A for transmission to the server 110 or the data processing system 155. The SaaS handler 135 can extract, receive, or otherwise obtain the browser identifier 145 from the database 125. The browser identifier 145 can be stored or maintained within the database 125 via the extension 130 and/or the browser application 120. The extension 130 can store the browser identifier 145 in response to one or more conditions, including but not limited to a detection of an update to the browser application 120, a navigation input on the browser application 120, a selection of a portion of the browser application 120, among other inputs captured by the extension 130. In some implementation, the SaaS handler 135 can embed the browser identifier 145 associated with the browser application 120 within the message 205A.

The SaaS handler 135 can transmit the message 205A to the data processing system 155 or the server 110 at a first time. The first time can be subsequent to a second time or a later time. Prior to transmission, the SaaS handler 135 can transmit a request to the server 110. The request can include metadata associated with the client device 105. In some implementations, the metadata can include authentication criteria for the client device 105 to interact with server 110 or the data processing system 155. The message handler 165 can receive, retrieve, or otherwise obtain the message 205A from the extension 130. The message handler 165 can transmit a response to the SaaS handler 135 to acknowledge the receipt of the message 205A. In some implementations, the message 205A may be transmitted at periodic intervals (e.g., once every minute, etc.), in response to one or more conditions (e.g., accessing a SaaS application, performing an authentication process, etc.), or in response to a request from the data processing system 155, among other circumstances.

The subdomain generator 170 can generate or identify a subdomain identifier based on the message 205A received from the client device 105. The subdomain identifier can include a collection of bits, integers, hash values, alphanumeric characters, composite identifiers, tokens among others. The subdomain identifier can be generated according to the browser identifier 145 transmitted with or included as part of the message 205A. The subdomain identifier can be unique to an instance of the extension 130 and/or the browser application 120 executing on the client device 105. In some implementations, the subdomain identifier may be generated to include or generated based on a universally unique identifier (UUID) associated with the extension 130 and/or the browser application 120 executing on the client device 105.

The subdomain generator 170 can bind, link, or otherwise associate the subdomain identifier with the browser identifier 145. To do so, the subdomain generator 170 can generate one or more data structures that includes the subdomain identifier and the browser identifier 145. For example, the subdomain generator 170 may update one or more data base entries corresponding to the generated subdomain identifiers and/or the browser identifiers 145 to associate the subdomain identifier with the browser identifier 145. The subdomain generator 170 can extract the browser identifier 145 from the message 205A. In some instances, the subdomain generator 170 can receive the browser identifier 145 from the SaaS handler 135. In some implementations, the subdomain generator 170 can generate a token that encodes the association between the browser identifier 145 and the subdomain identifier.

The message handler 165 can transmit, send or otherwise provide a uniform resource identifier (URI) 210 to the client device 105 that includes the subdomain identifier. The URI 210 can include, for example, the subdomain identifier (e.g., provided as a subdomain), a base domain (e.g., a predetermined domain corresponding to the data processing system 155 or a server associated with the data processing system 155), and a resource path, among attributes. In some implementations, the URI may include other attributes, such as query parameters or port information, among other attributes. The URI can be generated to correspond to the secure hypertext transfer protocol (HTTPS) or the secure file transfer protocol (FTPS). The data processing system 155 can concatenate the URI attributes to generate the URI. Once the URI is generated, the message handler 165 can transmit the URI 210 to the client device 105 in a response message (e.g., in response to the message 205A).

The request generator 140 of the extension 130 can receive the uniform resource identifier (URI) 210 and, based on the URI 210, can generate a DNS request 215. The DNS request 215 can correspond to a query that can resolve a human readable domain name, such as www.123.com, into an internet protocol (IP) address, such as 12.345.678.90, among others. In some implementations, the request generator 140 can transmit the DNS request 215 using a suitable protocol, such as the transmission control protocol (TCP) or the user datagram protocol (UDP) over one or more ports. The DNS request 215 can be transmitted such that the DNS request 215 can be routed to the DNS system 115. The DNS request 215 can include a query name, a query type, a query class, a header, or additional sections, among others.

The request generator 140 can parse the URI 210 to generate the DNS request 215. In parsing, the request generator 140 can extract the host portion from the URI 210. The request generator 140 can use the host portion to check a DNS cache at the client device 105 for a DNS resolver lookup. The request generator 140 can generate the DNS request 215 using a result of the DNS resolver lookup and the host portion pf the URI 210. The request generator 140 can transmit the DNS request 215 to the DNS system 115 via the UDP or TCIP ports. The transmission of the DNS request 215 can cause the DNS system 115 to provide a DNS response 220 to the extension 130. The DNS response 220 can be a message or indication to acknowledge the reception of the DNS request 215.

In some instances, at a second time, the SaaS handler 135 can generate a message 205B associated with a second instance of the browser extension 130 executing on the client device 105. The second time can be subsequent to the first time. The message 205B can be a signal, a notification, a collection of bits, that includes the user identifier and/or an identifier of the instance of the browser extension 130 associated with the client device 105. In some implementations, the SaaS handler 135 can embed the user identifier from the SaaS application and/or the identifier of the instance of the browser extension 130 within the message 205B for transmission to the server 110 or the data processing system 155. The SaaS handler 135 can extract, receive, or otherwise obtain the identifier of the second instance of the browser extension (e.g., a second browser identifier 145) from the database 125. Once retrieved, the SaaS handler 135 can embed the second browser identifier 145 associated with the second instance of the browser extension 130 within the message 205B. The SaaS handler 135 can determine that the user identifier is associated with the second browser identifier 145 by executing a query for the second browser identifier 145 within the database 160, in some implementations.

In some implementations, the client device 105 can transmit the message 205B to the data processing system 155 or the server 110. In some implementations, prior to transmission, the SaaS handler 135 can transmit a request to the server 110. The request can include metadata associated with the client device 105. The metadata can include authentication criteria for the client device 105 to interact with server 110 or the data processing system 155. Upon authenticating the authorization criteria, the SaaS handler 135 can transmit the message 205B. The message handler 165 can receive, retrieve, or otherwise obtain the message 205B from the extension 130. The message handler 165 can transmit a response to the SaaS handler 135 to acknowledge the receipt of the message 205B.

The subdomain generator 170 can generate or identify a second subdomain identifier based on the message 205B received from the client device 105. The second subdomain identifier can include a collection of bits, integers, hash values, alphanumeric characters, composite identifiers, tokens, or any other information that may be used to generate a subdomain identifier that is unique to the second instance of the browser extension 130 (e.g., the second browser identifier 145). The subdomain generator 170 can bind, link, or otherwise associate the second subdomain identifier with the second browser identifier 145. The subdomain generator 170 can extract the second browser identifier 145 from the message 205B. In doing so, the data processing system 155 can generate unique subdomain identifiers for each instance of the browser extension 130 that transmits a corresponding message (e.g., message 205A, message 205B, etc.) to the data processing system.

Figure 3:
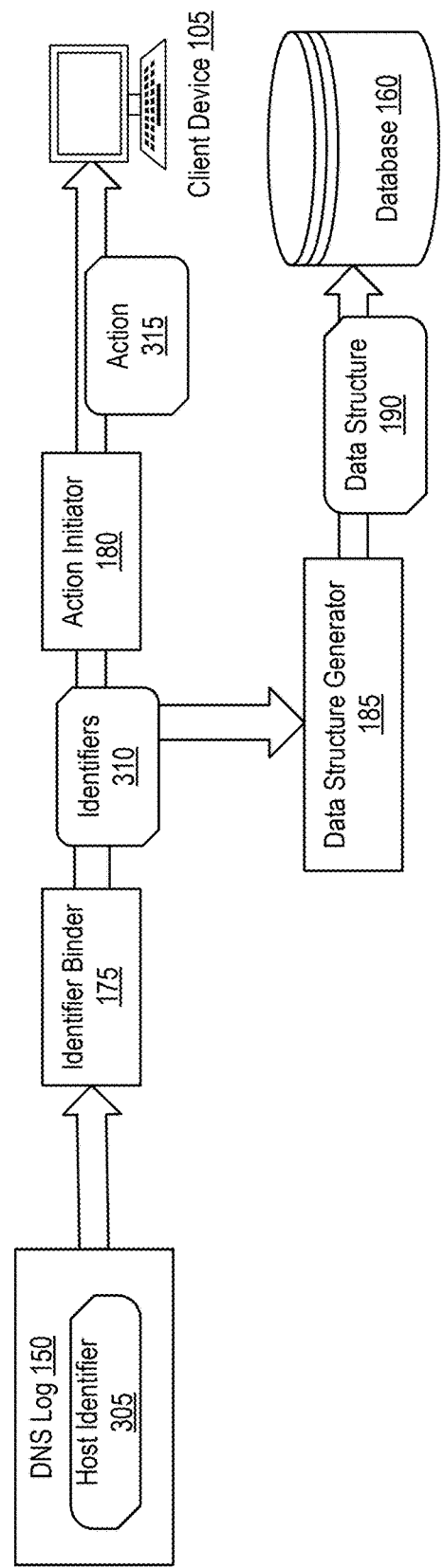
FIG. 3 illustrates an example of a process of linking a browser identifier, a SaaS identity and a host identifier, according to an embodiment.

FIG. 3 illustrates an example of a process of linking the browser identifier, a SaaS identity and a host identifier. The process 300 can include or correspond to operations performed in the system 100. Under the process 300, the data processing system 155 can retrieve or otherwise access a DNS log 150 from the DNS system 115. A DNS resolver or a DNS server associated with the DNS system 115 can generate or provide a resolution message for inclusion in the DNS log 150 in response to interpreting the DNS request 215. In some implementations, the DNS system 115 can be, operate within, or be in communication with an EDR system that intercepts one or more DNS request 215 transmitted by the client device 105, such that the DNS log 150 includes various security telemetry data generated by the client device 105, as described herein.

The DNS log 150 can store a timestamp, a client IP address, the host identifier 305, a query name, a query type, a query class, a response code, a resolved IP address, a time to live value, or a response time metric, among other information that may be stored in association with DNS requests in EDR log data. In some implementations, the DNS log 150 can further store a flag indicating recursion, a DNS server IP address, a transport protocol, a DNS zone, and/or a hostname observed during the query, among other metadata. In some implementations, the DNS log 150 can include EDR telemetry such as an application path, a process identifier, and/or the host identifier 305 (e.g., a globally unique identifier, other identifiers described herein, etc.) associated with the client device 105. The DNS system 115 can determine a storage location for the DNS log 150 based on the network element (e.g., the DNS server, etc.) that performs interpretation of the DNS request 215.

The identifier binder 175 can access the DNS log 150 from the DNS system 115 upon retrieval by the data processing system 155 using the subdomain identifier. When accessing the DNS log 150, the identifier binder 175 can extract, obtain, or otherwise identify entries that identify the unique subdomain. As the subdomains generated according to the techniques described herein are uniquely associated with an instance of the browser extension 130, the entries in the DNS log 150 can include data (e.g., the host identifier) that is known to correspond to the client device. The identifier binder 175 can retrieve the host identifier 305 from the entries in the DNS log 150 that include the unique subdomain.

The host identifier 305 can be metadata, data, or information within the DNS log 150. The host identifier 305 can be an IP address, a MAC address, a hostname, a client ID, a session token, among other identifiers. The host identifier 305 can refer or correspond to an origin of the DNS request 215 or source of the DNS query. In some instances, the extension 130 can transmit a message to the data processing system 155. The message can include the DNS response 220 which is embedded with the DNS log 150. The identifier binder 175 can receive the message to extract the information with the DNS response 220. In this manner, the identifier binder 175 can access the DNS log 150 from the DNS system 115 in response to the message.

The identifier binder 175 can bind, link, or otherwise associate identifiers 310 (e.g., the browser identifier 145, the user identifier, the host identifier 305). The identifier binder 175 can bind or link the browser identifier 145 and the user identifier 310 with the host identifier 305 of the client device 105. The identifier binder 175 can bind the identifiers 310 by implicitly or explicitly creating a relationship between each of the identifiers 310 (e.g., associating a browser session with a client device IP or MAC address). To explicitly bind the identifiers 310, the identifier binder 175 can store each of the identifiers 310 within the database 160 in one or more data structures. The identifier binder 175 can provide the identifiers 310 to the action initiator 180 and the data structure generator 185.

To associate the identifiers, the data structure generator 185 can generate, identify, or otherwise determine at least one data structure 190 to store the browser identifier 145, the user identifier 310, and the host identifier 305 of the client device 105. The at least one data structure 190 can include an array, a linked list, a stack, a tree, a hash table, among others. For example, the data structure can be a hash table where the client device 105 or browser application 120 is the key to the hash table and the identifiers 310 are the value of the hash table. The hash table can include a plurality of keys (e.g., for each browser extension 130 and/or browser application 120, etc.) mapped to a plurality of values (i.e., identifiers 310). In another example, the data structure can be a plurality of linked lists. A first linked list can correspond to a first browser application 120. Each node in the first linked list can correspond to the identifiers 310. Concurrently, a second linked list can correspond to a second browser application 120. Each node in the second linked list can correspond to the identifiers 310. In some implementations, the data structure generator 185 can store an association between the client device 105 and the identifiers 310.

The action initiator 180 use the generated associations between the host identifier 305, the user identifier, and the browser extension 130 to perform one or more security actions. For example, the action initiator 180 can generate, identify or determine at least one security action 315 (referred to as "action 315" herein) for the client device 105 based on the identifiers 310. The action 315 can be one or more operations, functions, mechanisms, protocols, or system calls to protect, manage, or otherwise monitor the client device 105. The action initiator 180 can implement the actions 315 using software (e.g., machine readable instructions) and hardware (e.g., one or more processors) that are executed on the client device 105, operating systems, servers, or data centers. In some instances, the actions 315 can be organized as preventative, detective, corrective, deterrent, or recovery actions, among others.

The action initiator 180 can access the database 160 to retrieve, extract, or otherwise obtain an expected host identifier 310 that is associated with a user identifier and/or browser identifier 145. The expected host identifier 310 can be a pre-registered, pre-generated, or pre-recorded data value that identifies the client device 105 expected to access a SaaS application and/or one or more network resources using the associated user identifier (e.g., the SaaS identifier, etc.). The expected host identifier 310 can be generated according to the techniques described herein. In some implementations, the host identifier 310 may be associated with the given The action initiator 180 can initiate the action 315 based on a mismatch between the host identifier 305 and an expected host identifier of the client device 105. The mismatch can be determined based on a comparison between the host identifier 305 and the expected host identifier. The action initiator 180 can determine the mismatch by executing a query on the expected host identifiers associated with the client device 105 within the database 160 to identify the corresponding host identifier 305 of the client device 105. For example, the host identifier 305 can be IP address "123.456.789.012" and the expected host identifier can be IP address "123.456.789.201". The action initiator 180 can execute the query resulting in the mismatch between the expected host identifier and the host identifier 305 of the client device 105. The mismatch can indicate an authenticity of the use, anomalies associated with the client device 105, possible enforced access control compliance, among others. If the mismatch is not detected, the action initiator 180 may not transmit or generate the action 315.

The action initiator 180 can transmit the action 315 to the client device 105 to cause, trigger or initiate the at least one action 315 at the client device 105 in response to the detection of the mismatch. The at least one action 315 can include blocking network access to the client device 105. The transmission of the at least one action 315 can trigger the client device 105 to implement or execute the action 315. To block network access, the action 315 can cause the client device 105 to automatically implement or execute firewall rule injection, switch port shutdown, VLAN reassignment, or reverse proxy denial, among other network level responses.

The action initiator 180 can transmit the action 315 to the client device 105 and/or another device (e.g., a router, switch) to cause, trigger or initiate the at least one action 315 at or involving the client device 105 in response to the detection of the mismatch. The at least one action 315 can include logging data transmitted by the client device 105. The action 315 can cause the client device 105 to provide a log, record, or information associated with data transmitted by the client device 105. The action initiator 180 can obtain the log from the client device 105, in some implementations. Upon receipt, the action initiator 180 can provide the log to the server 110 for review by one or more administrators. In some implementations, the server 110 can receive feedback according to the log from the administrators and provide the feedback to the action initiator 180. The action initiator can determine a subsequent action 315 based on the feedback.

The action initiator 180 can transmit the action 315 to the client device 105 to cause, trigger or initiate the at least one action 315 at the client device 105 in response to the detection of the mismatch. The at least one action 315 can include generating an alert identifying the client device 105. The alert can be a notification, an indication, a flag, a message that displays on the client device 105. The alert can indicate the mismatch between the expected host identifier and the host identifier 305. The alert can be subsequently provided to the server 110 for review by the one or more administrators. The client device 105 can display the alert within a portion of the browser application 120.

Figure 4:
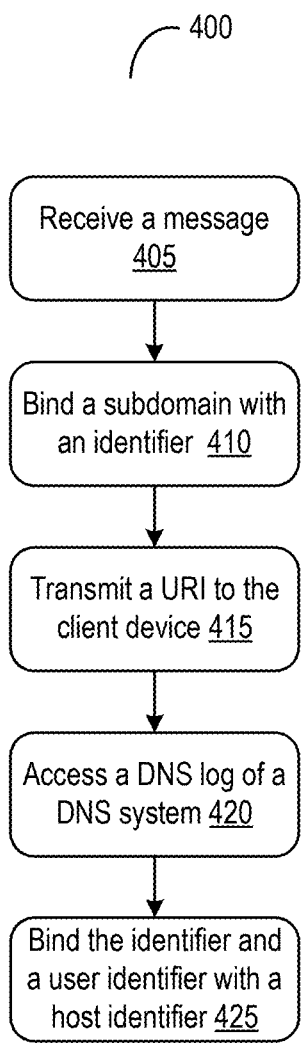
FIG. 4 illustrates a flow diagram of a method for managing network identifiers in distributed computing systems, according to an embodiment.

FIG. 4 illustrates a flow diagram of a method for managing network identifiers in distributed computing systems. The method 400 can be implemented or performed by any components detailed herein, such as system 100 or system 500. Under the method 400, a computing system can receive a message (405). The computing system can bind a subdomain identifier with a browser identifier (410). The computing system can transmit a URI to the client device (415). The computing system can access a DNS log of a DNS system (420). The computing system can bind the browser identify and the user identifier with a host identifier (425).

The computing system can receive the message (405). The message can include an identifier of a browser extension executing on the client device and a user identifier of a SaaS application. The computing system can receive the user identifier from the SaaS application, or from the client device, in some implementations. The user identifier may be any type of identifier that may identify a user with respect to a SaaS application, one or more network resources, and/or one or more computing platforms.

The computing system can bind a subdomain identifier with a browser identifier (410). The computing system can generate the subdomain identifier in response to the message received from the client device. The computing system can generate the subdomain identifier to be unique to an instance of the browser extension executing on the client device. Similar approaches can be performed during subsequent time periods, for example, if the same client device executes a different instance of the browser extension at a later time period. In such instances, the computing system can generate subdomain identifiers that are unique to each instance of the browser extension.

The computing system can transmit a URI to the client device (415). The URI can cause the browser extension to transmit a domain name service (DNS) request to a DNS system to resolve the URI. The DNS request can include a host identifier of the client device. As described herein, the DNS system may be, may be a part of, may otherwise or otherwise associated with, an EDR system that can track and/or log DNS requests transmitted by the client system in one or more DNS logs. The DNS system can automatically log or otherwise store an indication of the host identifier (e.g., an IP address, GUID, etc.) of the client device that transmitted the DNS request in association with the DNS request.

The computing system can access a DNS log of a DNS system (420). The computing system can retrieve or otherwise access the DNS log from the DNS system after a first time period. To do so, the computing system may use one or more APIs of the DNS system or other access techniques. In some implementations, the DNS system can access the DNS log to identify entries that include the subdomain identifier that is unique to the client device. The computing system can extract the host identifier from the identified entries. As the subdomain is generated to be unique to the browser instance of the client device, the computing system can use the entry in the DNS log to associate the browser instance with the host identifier.

The computing system can bind the browser identifier and the user identifier with the host identifier (425). The computing system can generate at least one data structure to store the identifier of the browser extension, the user identifier, and the host identifier of the client device. The computing system can initiate a security action based on a mismatch between the host identifier and an expected host identifier of the client device. The security action can include one or more of blocking network access to a computing system, logging data transmitted by the client device, or generating an alert identifying the client device.

Figure 5:
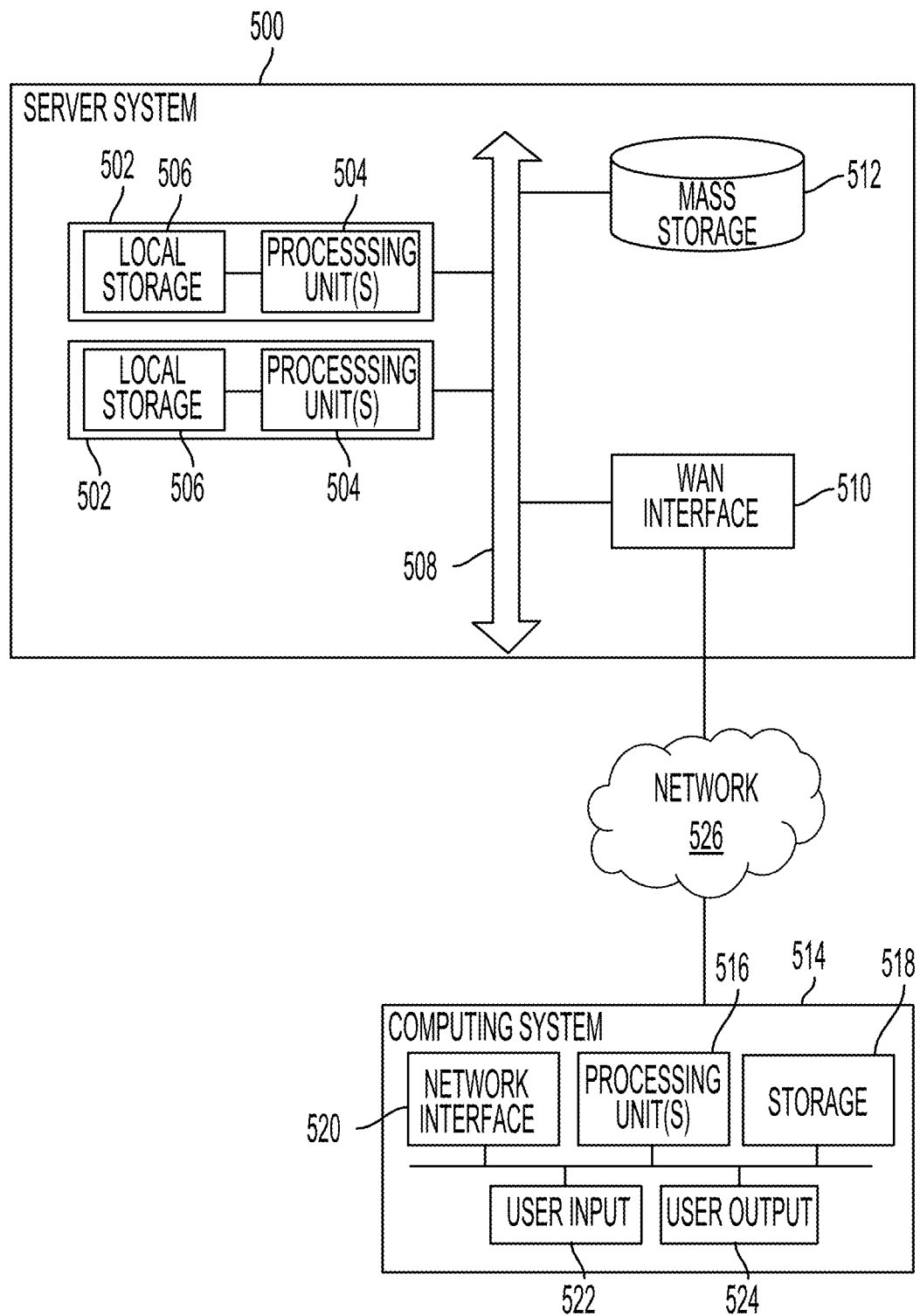
FIG. 5 illustrates a sample computing system, according to an embodiment.

Various operations described herein can be implemented on computer systems. FIG. 5 shows a simplified block diagram of a representative server system 500, computing system 514, and network 526 usable to implement certain embodiments of the present disclosure. In various embodiments, server system 500 or similar systems can implement services or servers described herein or portions thereof. Computing system 514 or similar systems can implement clients described herein. The system 100 described herein can be similar to the server system 500. Server system 500 can have a modular design that incorporates a number of modules 502 (e.g., blades in a blade server embodiment); while two modules 502 are shown, any number can be provided. Each module 502 can include processing unit(s) 504 and local storage 506.

Processing unit(s) 504 can include a single processor, which can have one or more cores, or multiple processors. In some embodiments, processing unit(s) 504 can include a general-purpose primary processor as well as one or more special-purpose co-processors such as graphics processors, digital signal processors, or the like. In some embodiments, some, or all processing units 504 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 504 can execute instructions stored in local storage 506. Any type of processors in any combination can be included in processing unit(s) 504.

Local storage 506 can include volatile storage media (e.g., DRAM, SRAM, SDRAM, or the like) and/or non-volatile storage media (e.g., magnetic, or optical disk, flash memory, or the like). Storage media incorporated in local storage 506 can be fixed, removable, or upgradeable as desired. Local storage 506 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 504 need at runtime. The ROM can store static data and instructions that are needed by processing unit(s) 504. The permanent storage device can be a non-volatile read-and-write memory device that can store instructions and data even when module 502 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 506 can store one or more software programs to be executed by processing unit(s) 504, such as an operating system and/or programs implementing various server functions such as functions of the system 100 or any other system described herein, or any other server(s) associated with system 100 or any other system described herein.

"Software" refers generally to sequences of instructions that, when executed by processing unit(s) 504, cause server system 500 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 504. Software can be implemented as a single program or a collection of separate programs or program modules that interact as desired. From local storage 506 (or non-local storage described below), processing unit(s) 504 can retrieve program instructions to execute and data to process in order to execute various operations described above.

In some server systems 500, multiple modules 502 can be interconnected via a bus or other interconnect 508, forming a local area network that supports communication between modules 502 and other components of server system 500. Interconnect 508 can be implemented using various technologies, including server racks, hubs, routers, etc.

A wide area network (WAN) interface 510 can provide data communication capability between the local area network (e.g., through the interconnect 508) and the network 526, such as the Internet. Other technologies can be used to communicatively couple the server system 500 with the network 526, including wired (e.g., Ethernet, IEEE 502.3 standards) and/or wireless technologies (e.g., Wi-Fi, IEEE 502.11 standards).

In some embodiments, local storage 506 is intended to provide working memory for processing unit(s) 504, providing fast access to programs and/or data to be processed while reducing traffic on interconnect 508. Storage for larger quantities of data can be provided on the local area network by one or more mass storage 512 that can be connected to interconnect 508. Mass storage 512 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage 512. In some embodiments, additional data storage resources may be accessible via WAN interface 510 (potentially with increased latency).

Server system 500 can operate in response to requests received via WAN interface 510. For example, one of modules 502 can implement a supervisory function and assign discrete tasks to other modules 502 in response to received requests. Work allocation techniques can be used. As requests are processed, results can be returned to the requester via WAN interface 510. Such operation can generally be automated. Further, in some embodiments, WAN interface 510 can connect multiple server systems 500 to each other, providing scalable systems capable of managing high volumes of activity. Other techniques for managing server systems and server farms (collections of server systems that cooperate) can be used, including dynamic resource allocation and reallocation.

Server system 500 can interact with various user-owned or user-operated devices via a wide-area network such as the Internet. An example of a user-operated device is shown in FIG. 5 as computing system 514. Computing system 514 can be implemented, for example, as a consumer device such as a smartphone, other mobile phone, tablet computer, wearable computing device (e.g., smart watch, eyeglasses), desktop computer, laptop computer, and so on.

For example, computing system 514 can communicate via WAN interface 510. Computing system 514 can include computer components such as processing unit(s) 516, storage device 518, network interface 520, user input device 522, and user output device 524. Computing system 514 can be a computing device implemented in a variety of form factors, such as a desktop computer, laptop computer, tablet computer, smartphone, other mobile computing device, wearable computing device, or the like.

Processing unit 516 and storage device 518 can be similar to processing unit(s) 504 and local storage 506 described above. Suitable devices can be selected based on the demands to be placed on computing system 514. For example, computing system 514 can be implemented as a "thin" client with limited processing capability or as a high-powered computing device. Computing system 514 can be provisioned with program code executable by processing unit(s) 516 to enable various interactions with server system 500.

Network interface 520 can provide a connection to the network 526, such as a wide area network (e.g., the Internet) to which WAN interface 510 of server system 500 is also connected. In various embodiments, network interface 520 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 522 can include any device (or devices) via which a user can provide signals to computing system 514; computing system 514 can interpret the signals as indicative of particular user requests or information. In various embodiments, user input device 522 can include any or all of a keyboard, touch pad, touch screen, mouse, or other pointing device, scroll wheel, click wheel, dial, button, switch, keypad, microphone, and so on.

User output device 524 can include any device via which computing system 514 can provide information to a user. For example, user output device 524 can include display-to-display images generated by or delivered to computing system 514. The display can incorporate various image generation technologies, e.g., a liquid crystal display (LCD), light-emitting diode (LED) display including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 524 can be provided in addition to or instead of a display. Examples include indicator lights, speakers, tactile "display" devices, printers, and so on.

Some embodiments include electronic components, such as microprocessors, storage, and memory that store computer program instructions in a computer readable storage medium. Many of the features described in this specification can be implemented as processes that are specified as a set of program instructions encoded on a computer readable storage medium. When one or more processing units execute these program instructions, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 504 and 516 can provide various functionality for server system 500 and computing system 514, including any of the functionality described herein as being performed by a server or client, or other functionality.

It will be appreciated that server system 500 and client computing system 514 are illustrative and that variations and modifications are possible. Computer systems used in connection with embodiments of the present disclosure can have other capabilities not specifically described here. Further, while server system 500 and client computing system 514 are described with reference to particular blocks, it is to be understood that these blocks are defined for convenience of description and are not intended to imply a particular physical arrangement of component parts. For instance, different blocks can be, but need not be, located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies, including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or digital versatile disk (DVD), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:
   one or more processors coupled to non-transitory memory, the one or more processors configured to:
   receive, from a client device, a message comprising an identifier of a browser extension executing on the client device and a user identifier of a software-as-a-service (SaaS) application;
   bind a subdomain identifier with the identifier of the browser extension;
   transmit a uniform resource identifier (URI) including the subdomain identifier to the client device, causing the browser extension to transmit a domain name service (DNS) request to a DNS system to resolve the URI, the DNS request comprising a host identifier of the client device;
   access a DNS log of the DNS system to identify the host identifier using the subdomain identifier; and
   bind the identifier of the browser extension and the user identifier with the host identifier of the client device.

2. The system of claim 1, wherein the one or more processors are further configured to receive the user identifier from the SaaS application.

3. The system of claim 1, wherein the one or more processors are further configured to generate at least one data structure storing the identifier of the browser extension, the user identifier, and the host identifier of the client device.

4. The system of claim 1, wherein the one or more processors are further configured to retrieve the DNS log from the DNS system after a first time period.

5. The system of claim 1, wherein the one or more processors are further configured to access the DNS log from the DNS system in response to a second message from the browser extension.

6. The system of claim 1, wherein the one or more processors are further configured to initiate a security action based on a mismatch between the host identifier and an expected host identifier of the client device.

7. The system of claim 6, wherein the security action comprises one or more of blocking network access to a computing system, logging data transmitted by the client device, or generating an alert identifying the client device.

8. The system of claim 1, wherein the one or more processors are further configured to generate the subdomain identifier in response to the message received from the client device.

9. The system of claim 8, wherein the one or more processors are further configured to generate the subdomain identifier to be unique to an instance of the browser extension executing on the client device.

10. The system of claim 1, wherein the message is a first message received at a first time, and wherein the one or more processors are further configured to:
    receive a second message from the client device at a second time, the second message comprising a second identifier of the browser extension and the user identifier;
    determine that the user identifier is associated with the identifier of the browser extension; and
    responsive to determining that the user identifier is associated with the identifier of the browser extension, generate a second subdomain identifier in response to the second message.

11. A method, comprising:
    receiving, by one or more processors coupled to non-transitory memory, from a client device, a message comprising an identifier of a browser extension executing on the client device and a user identifier of a software-as-a-service (SaaS) application;
    binding, by the one or more processors, a subdomain identifier with the identifier of the browser extension;
    transmitting, by the one or more processors, a uniform resource identifier (URI) including the subdomain identifier to the client device, causing the browser extension to transmit a domain name service (DNS) request to a DNS system to resolve the URI, the DNS request comprising a host identifier of the client device;
    accessing, by the one or more processors, a DNS log of the DNS system to identify the host identifier using the subdomain identifier; and
    binding, by the one or more processors, the identifier of the browser extension and the user identifier with the host identifier of the client device.

12. The method of claim 11, further comprising receiving, by the one or more processors, the user identifier from the SaaS application.

13. The method of claim 11, further comprising generating, by the one or more processors, at least one data structure storing the identifier of the browser extension, the user identifier, and the host identifier of the client device.

14. The method of claim 11, further comprising retrieving, by the one or more processors, the DNS log from the DNS system after a first time period.

15. The method of claim 11, further comprising accessing, by the one or more processors, the DNS log from the DNS system in response to a second message from the browser extension.

16. The method of claim 11, further comprising initiating, by the one or more processors, a security action based on a mismatch between the host identifier and an expected host identifier of the client device.

17. The method of claim 16, wherein the security action comprises one or more of blocking network access to a computing system, logging data transmitted by the client device, or generating an alert identifying the client device.

18. The method of claim 11, further comprising generating, by the one or more processors, the subdomain identifier in response to the message received from the client device.

19. The method of claim 18, further comprising generating, by the one or more processors, the subdomain identifier to be unique to an instance of the browser extension executing on the client device.

20. The method of claim 11, wherein the message is a first message received at a first time, and further comprising:
- receiving, by the one or more processors, a second message from the client device at a second time, the second message comprising a second identifier of the browser extension and the user identifier;
- determining, by the one or more processors, that the user identifier is associated with the identifier of the browser extension; and
- responsive to determining that the user identifier is associated with the identifier of the browser extension, generating, by the one or more processors, a second subdomain identifier in response to the second message.

* * * * *